(12) United States Patent
Pansegrouw

(10) Patent No.: US 9,969,316 B2
(45) Date of Patent: May 15, 2018

(54) DUNNAGE BAG ARRANGEMENT

(71) Applicant: Stopak India Pvt. Ltd., Bangalore (IN)

(72) Inventor: Bester Jacobus Pansegrouw, Ottery (ZA)

(73) Assignee: Stopak India Pvt. Ltd., Bangalore (IN)

( * ) Notice: Subject to any disclaimer, the term of this patent is extended or adjusted under 35 U.S.C. 154(b) by 0 days. days.

(21) Appl. No.: 15/114,028

(22) PCT Filed: Jan. 27, 2015

(86) PCT No.: PCT/IB2015/050592
§ 371 (c)(1),
(2) Date: Jul. 25, 2016

(87) PCT Pub. No.: WO2015/111021
PCT Pub. Date: Jul. 30, 2015

(65) Prior Publication Data
US 2016/0347232 A1    Dec. 1, 2016

(30) Foreign Application Priority Data
Jan. 27, 2014   (ZA) .................................. 2014/00630

(51) Int. Cl.
*B60P 7/06*         (2006.01)
*B65D 81/05*        (2006.01)

(52) U.S. Cl.
CPC ............ *B60P 7/065* (2013.01); *B65D 81/052* (2013.01)

(58) Field of Classification Search
CPC .. B60P 7/065; B60P 7/16; B60P 7/135; B60P 3/073; B60P 7/0876; B60P 3/075; B60P 3/20; B60P 3/2235; B65D 81/052; B65D 90/0073; B65D 90/004; B65D 2590/005; B65D 33/14; B65D 77/06; B65D 81/053
(Continued)

(56) References Cited

U.S. PATENT DOCUMENTS 2,990,070 A   6/1961   Cushman
3,028,981 A   4/1962   Ford et al.
(Continued)

FOREIGN PATENT DOCUMENTS

CA   2 254 253   6/2004
EP   0 924 140   6/1999
(Continued)

OTHER PUBLICATIONS

Notification of the Recording of a Change Form PCT/IB/306 for International Application No. PCT/IB2015/050592 dated May 27, 2016.
(Continued)

*Primary Examiner* — D Glenn Dayoan
*Assistant Examiner* — Sunsurraye Westbrook
(74) *Attorney, Agent, or Firm* — Neal, Gerber & Eisenberg LLP

(57) ABSTRACT

Various embodiments of the present disclosure provide a dunnage bag arrangement for securing loads. The dunnage bag arrangement includes an inflatable dunnage bag having a gastight inflatable bladder, a top edge, a bottom edge, a first side edge and a second side edge; and at least one inflation valve adapted for inflating the gastight inflatable bladder and being located along the first side edge and/or the second side edge.

15 Claims, 2 Drawing Sheets

(58) Field of Classification Search
USPC ..... 410/119, 125, 87, 118, 129, 155, 20, 36, 410/4, 88, 97, 98; 267/113
See application file for complete search history.

(56) References Cited

U.S. PATENT DOCUMENTS

| | | | |
|---|---|---|---|
| 3,072,270 | A | 1/1963 | Tolby et al. |
| 3,131,648 | A | 5/1964 | Seger |
| 3,145,853 | A | 8/1964 | Langenberg |
| 3,199,689 | A | 8/1965 | Feldkamp |
| 3,442,402 | A | 5/1969 | Baxter |
| 3,554,135 | A | 1/1971 | Duvall et al. |
| 3,556,318 | A | 1/1971 | Hollis |
| 3,643,268 | A | 2/1972 | Stamberger |
| 3,667,625 | A | 6/1972 | Lucas |
| 3,868,026 | A | 2/1975 | Baxter |
| 3,939,995 | A | 2/1976 | Baxter |
| 3,960,281 | A * | 6/1976 | Reeves .................. B60P 7/065 410/119 |
| 4,044,693 | A * | 8/1977 | Ramsey, Jr. ........... B60P 7/065 206/522 |
| 4,102,364 | A | 7/1978 | Leslie et al. |
| 4,116,344 | A | 9/1978 | Ziemba |
| 4,136,788 | A | 1/1979 | Robbins |
| 4,553,887 | A | 11/1985 | Reeves |
| 4,569,949 | A * | 2/1986 | Brenner .................... C08J 9/14 521/147 |
| 4,591,519 | A | 5/1986 | Liebel |
| 5,139,842 | A | 8/1992 | Sewell |
| 5,683,182 | A | 11/1997 | Moore |
| 5,788,438 | A * | 8/1998 | Goshorn ............. B65D 81/052 410/119 |
| 5,868,534 | A | 2/1999 | Goshorn et al. |
| 5,908,275 | A | 6/1999 | Howlett, Jr. et al. |
| 6,095,732 | A | 8/2000 | Howlett, Jr. et al. |
| 6,149,362 | A | 11/2000 | Berrier et al. |
| 6,186,714 | B1 | 2/2001 | Berrier et al. |
| 6,220,800 | B1 | 4/2001 | Elze et al. |
| 6,322,303 | B1 | 11/2001 | John |
| 6,435,787 | B1 | 8/2002 | John |
| 6,527,488 | B2 | 3/2003 | Elze et al. |
| D499,637 | S * | 12/2004 | Elze ............................... D9/708 |
| 7,011,480 | B2 | 3/2006 | Ahlert et al. |
| 7,128,510 | B2 | 10/2006 | Ahlert et al. |
| 7,137,765 | B1 | 11/2006 | Elze et al. |
| 7,909,554 | B2 | 3/2011 | Keenan et al. |
| 7,980,799 | B1 * | 7/2011 | Rioux .................... B60P 7/065 141/10 |
| 9,545,872 | B1 | 1/2017 | Wilson et al. |
| 2002/0136614 | A1 | 9/2002 | Elze et al. |
| 2004/0141824 | A1 | 7/2004 | Ahlert et al. |
| 2004/0181156 | A1 | 9/2004 | Kingsford et al. |
| 2009/0116927 | A1 | 5/2009 | Keenan et al. |
| 2015/0183194 | A1 | 7/2015 | Lehmann et al. |
| 2016/0130062 | A1 | 5/2016 | Pansegrouw |
| 2016/0347231 | A1 | 12/2016 | Pansegrouw |

FOREIGN PATENT DOCUMENTS

| | | |
|---|---|---|
| EP | 0 978 461 | 2/2000 |
| WO | WO 03/078251 | 9/2003 |

OTHER PUBLICATIONS

International Search Report and Written Opinion for International Application No. PCT/IB2015/050592 dated Jul. 1, 2015.
Office Action dated May 22, 2017 in co-pending U.S. Appl. No. 15/114,023 (14 pages).
European Patent Office, Extended European Search Report in corresponding EPO Application No. 15740778.4, dated Sep. 18, 2017 (7 pages).

* cited by examiner

DUNNAGE BAG ARRANGEMENT

PRIORITY CLAIM

This application is a national stage entry of PCT/IB2015/050592, filed on Jan. 27, 2015, which claims priority to and the benefit of South African Patent Application No. 2014/00630, which was filed on Jan. 27, 2014, the entire contents of each of which are incorporated herein by reference.

FIELD

The present disclosure relates to a dunnage bag arrangement.

More particularly, the present disclosure relates to an inflatable dunnage bag arrangement.

BACKGROUND

Conventional inflatable and disposable dunnage bags include a gastight bladder, usually constructed from polyethylene material, surrounded by an outer protective and supportive casing consisting of at least one ply of paper material. These dunnage bags are used to fill spaces between cargo or between the cargo and the walls of freight carriers to prevent the cargo from shifting and damaging either the cargo itself and/or the walls of the freight carrier. The dunnage bags are typically placed between the cargo in a deflated condition and are subsequently inflated with a gas. The pressure of the gas in the dunnage bags is determined by the application, the size of the dunnage bags, and the wall composition of the dunnage bags.

The problem with known dunnage bags is that some of the voids are so small that, when in the deflated position, the inflation valve is in an inaccessible position, for example too low. The disadvantages are that it is frustrating for the operator, is time consuming, sometimes the bag has to be deflated to reposition correctly, and sometimes it takes two operators to position and inflate a dunnage bag.

It is an object of the invention to suggest a dunnage bag arrangement that will assist in overcoming these problems.

SUMMARY

According to one embodiment of the present disclosure, a dunnage bag arrangement for securing loads includes:
  (a) an inflatable dunnage bag having a gastight inflatable bladder, a top edge, a bottom edge, a first side edge and a second side edge; and
  (b) at least one inflation valve adapted for inflating the gastight inflatable bladder and being located along the first side edge and/or the second side edge.

The inflation valve may be located along the first side edge and/or the second side edge.

The inflation valve may be located at least 5 to 30 mm from the top edge and/or the bottom edge.

According to another embodiment of the present disclosure, a method for securing a load includes the steps:
  (a) of providing in a void between loads to be secured, an inflatable dunnage bag having a gastight inflatable bladder, and having a top edge, a bottom edge, a first side edge and a second side edge;
  (b) of providing at least one inflation valve adapted for inflating the gastight inflatable bladder and being located along the first side edge and/or the second side edge; and
  (c) of inflating the inflatable dunnage bag, by means of the inflation valve, in order to secure the loads.

The dunnage bag may include at least one reinforcing sleeve adapted to surround the gastight inflatable bladder and being made of at least one material ply, the sleeve having a first opening and a second opening, and the sleeve being folded and sealed and/or stitched to close off at least one of the openings.

The sleeve may be made of at least one material ply selected from the material group consisting of paper, plastics material, woven PP (polypropylene), HDPE (high-density polyethylene) and PVC (polyvinylchloride).

In the case of paper sleeves, the sleeve ends may consist of flaps formed by cutting the sleeve at the opening being closed.

In the case of woven polypropylene sleeves, the sleeve ends are stitched.

The flaps at one end may be folded towards each other to close off the respective opening and/or at one end may be glued to each other to permanently close off the respective opening.

The dunnage bag may be provided with one to eight sleeves.

The dunnage bag may include an inner polyethylene layer or sleeve and an outer woven polypropylene layer or sleeve.

The inflatable bladder may be made of polyethylene.

The inflatable bladder may be provided with an inflation valve.

The inflation valve may protrude to the exterior at one of the openings.

The dunnage bag may be used in voids between 0.5 inch and 75 inches.

The dunnage bag may be substantially rectangular in shape.

The dunnage bag may be disposable. The dunnage bag may be applicable in conjunction with void fillers and/or be applicable in conjunction with friction panels.

At least 50% of the exterior surface area of the dunnage bag may be adapted in use to be in contact with a load to be secured.

The contact may be direct and/or indirect.

BRIEF DESCRIPTION OF DRAWINGS

The invention will now be described by way of example with reference to the accompanying schematic drawings.

DETAILED DESCRIPTION

Figure 1:
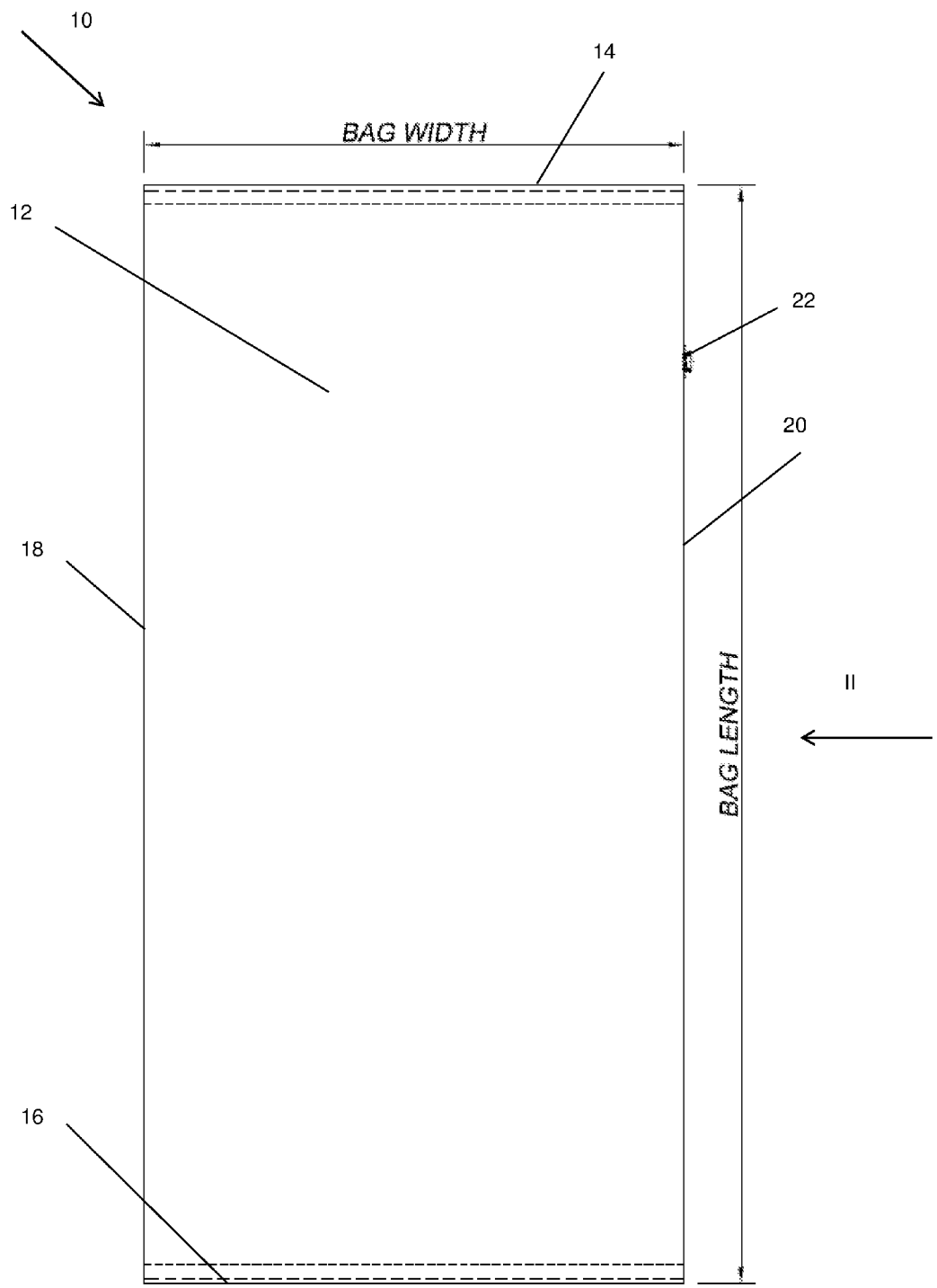
FIG. 1 is a front view of one example dunnage bag arrangement of the present disclosure before being inflated.
Figure 2:
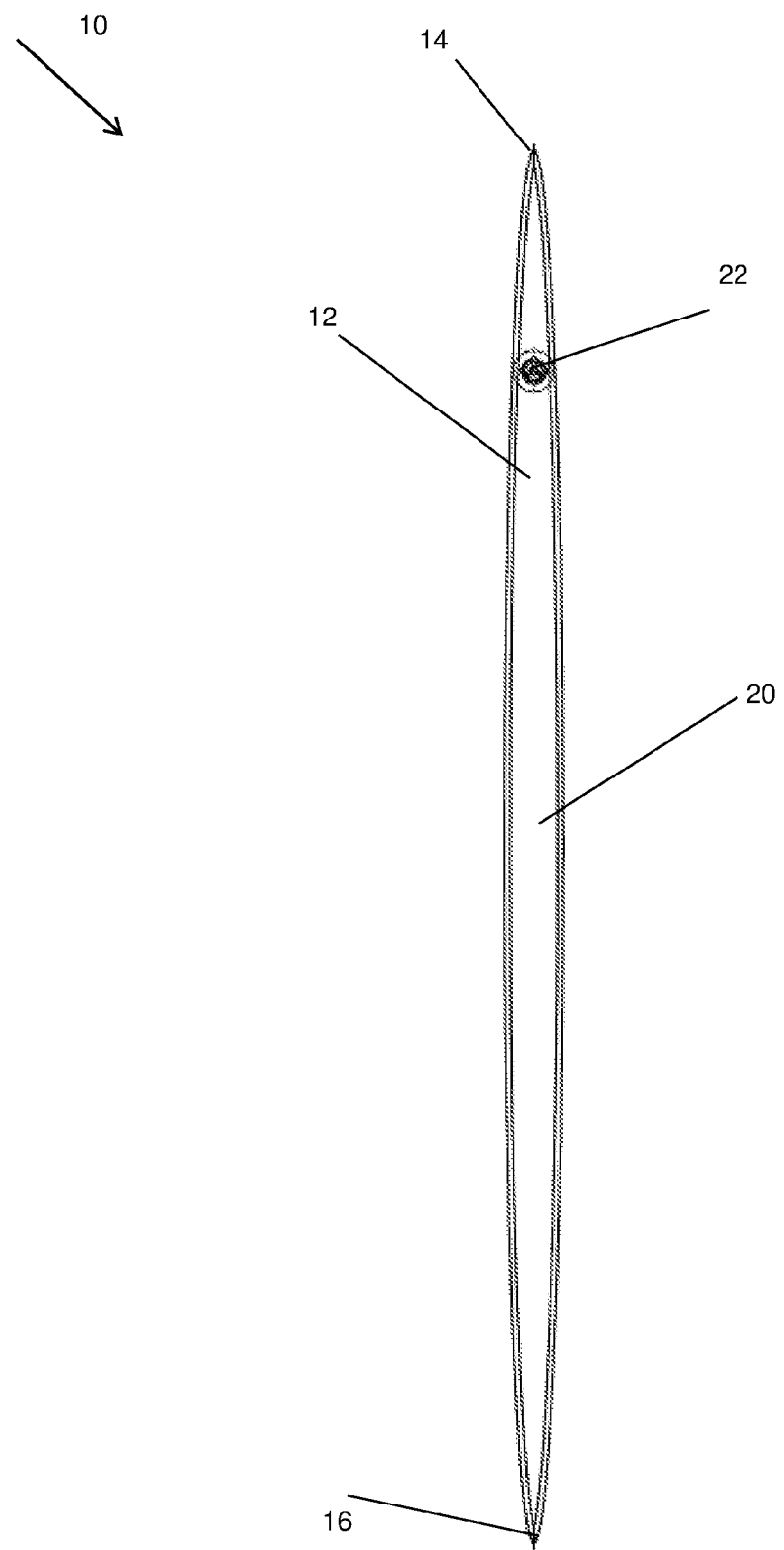
FIG. 2 is a side view of the dunnage bag as seen from arrow II in FIG. 1.

Referring to the drawings, there is shown a dunnage bag arrangement, generally indicated by reference numeral 10, in accordance with one example embodiment of the present disclosure.

The dunnage bag arrangement 10 for securing loads includes:
  (a) an inflatable dunnage bag 12 having a gastight inflatable bladder, a top edge 14, a bottom edge 16, a first side edge 18 and a second side edge 20; and
  (b) an inflation valve 22 adapted for inflating the gastight inflatable bladder and being located along the second side edge 20.

The inflation valve 22 is preferably located at least 5 to 30 mm from the top edge 14.

The dunnage bag 12 includes at least one reinforcing sleeve adapted to surround the gastight inflatable bladder and being made of at least one material ply, the sleeve having a first opening and a second opening, and the sleeve being folded and sealed and/or stitched to close off at least one of the openings.

The sleeve is made of at least one material ply selected from the material group consisting of paper, plastics material, woven PP (polypropylene), HDPE (high-density polyethylene) and PVC (polyvinylchloride). In the case of paper sleeves, the sleeve ends consist of flaps formed by cutting the sleeve at the opening being closed. The flaps at one end are folded towards each other to close off the respective opening. The flaps at one end are glued to each other to permanently close off the respective opening. In the case of woven polypropylene sleeves, the sleeve ends are stitched.

The dunnage bag arrangement can be provided with one to eight sleeves. The dunnage bag may include an inner polyethylene layer or sleeve and an outer woven polypropylene layer or sleeve. The inflatable bladder is made of polyethylene. The inflatable bladder is provided with an inflation valve. The inflation valve protrudes to the exterior at one of the openings. The dunnage bag arrangement can be used in voids between 0.5 inch and 75 inches. The dunnage bag arrangement can be substantially rectangular in shape. The dunnage bag arrangement can be disposable. The dunnage bag arrangement is applicable in conjunction with void fillers. The dunnage bag arrangement is applicable in conjunction with friction panels. At least 50% of the exterior surface area of the dunnage bag can be adapted to be in contact with a load to be secured. The contact can be direct or indirect.

Hence the dunnage bag arrangement 10 according to the invention, provides a method of securing loads, which includes the steps:
  (a) of providing in a void between loads to be secured, an inflatable dunnage bag 12 having a gastight inflatable bladder, and having a top edge 14, a bottom edge 16, a first side edge 18 and a second side edge 20;
  (b) of providing at least one inflation valve 22 adapted for inflating the gastight inflatable bladder and being located along the first side edge 18 and/or the second side edge 20; and
  (c) of inflating the inflatable dunnage bag, by means of the inflation valve 22, in order to secure the loads.

This positioning of the inflation valve 22 facilitates the operator to inflate the dunnage bag in small and narrow and low inaccessible voids.

The invention claimed is:

1. An inflatable dunnage bag including:
a gastight inflatable bladder;
a top edge;
a bottom edge;
a first side edge;
a second side edge; and
an inflation valve located along one of the first side edge and the second side edge, the inflation valve usable to inflate the gastight inflatable bladder, wherein the inflation valve is positioned at least 5 millimeters to 30 millimeters from one of the top edge and the bottom edge.

2. The dunnage bag of claim 1, which includes a reinforcing sleeve surrounding the gastight inflatable bladder, the reinforcing sleeve having a first opening and a second opening, the first opening and the second opening each being at least one of sealed closed and stitched closed.

3. The dunnage bag of claim 2, wherein the reinforcing sleeve is made of at least one of paper, plastic, woven polypropylene, high-density polyethylene, and polyvinylchloride.

4. The dunnage bag of claim 3, wherein when the reinforcing sleeve is made of paper, the first opening and the second opening are each sealed closed, and when the reinforcing sleeve is made of woven polypropylene, the first opening and the second opening are each stitched closed.

5. The dunnage bag of claim 4, wherein when the reinforcing sleeve is made of paper, the first opening and the second opening are each sealed closed using glue.

6. The dunnage bag of claim 2, which includes one to eight reinforcing sleeves.

7. The dunnage bag of claim 1, wherein the inflatable bladder is made of polyethylene, and which includes an outer woven polyethylene sleeve.

8. The dunnage bag of claim 1, wherein the inflatable bladder is made of polyethylene.

9. The dunnage bag of claim 1, wherein the inflatable dunnage bag is substantially rectangular.

10. A method for securing a plurality of loads, the method including:
  (a) positioning an inflatable dunnage bag in a void between the loads, the dunnage bag including a gastight inflatable bladder, a top edge, a bottom edge, a first side edge, a second side edge, and an inflation valve located along one of the first and second side edges; and
  (b) inflating the dunnage bag via the inflation valve to secure the loads, wherein the inflation valve: (1) is positioned along one of the first side edge and the second side edge, (2) is usable to inflate the gastight inflatable bladder, and (3) is positioned at least 5 millimeters to 30 millimeters from one of the top edge and the bottom edge.

11. The method of claim 10, wherein the void is between 0.5 inches and 75 inches.

12. The method of claim 10, which includes disposing the dunnage bag after use.

13. The method of claim 10, wherein the positioning of and the inflating of the dunnage bag causes at least 50% of an exterior surface area of the dunnage bag to contact the loads while the dunnage bag is in use.

14. The method of claim 13, wherein the contact is at least one of indirect and direct.

15. The method of claim 10, which includes using the dunnage bag in conjunction with at least one of a void filler and a friction panel.

* * * * *